July 17, 1951    E. R. BURGESS    2,560,631
AGRICULTURAL ATTACHMENT FOR TRACTORS
Filed June 9, 1947    2 Sheets-Sheet 1
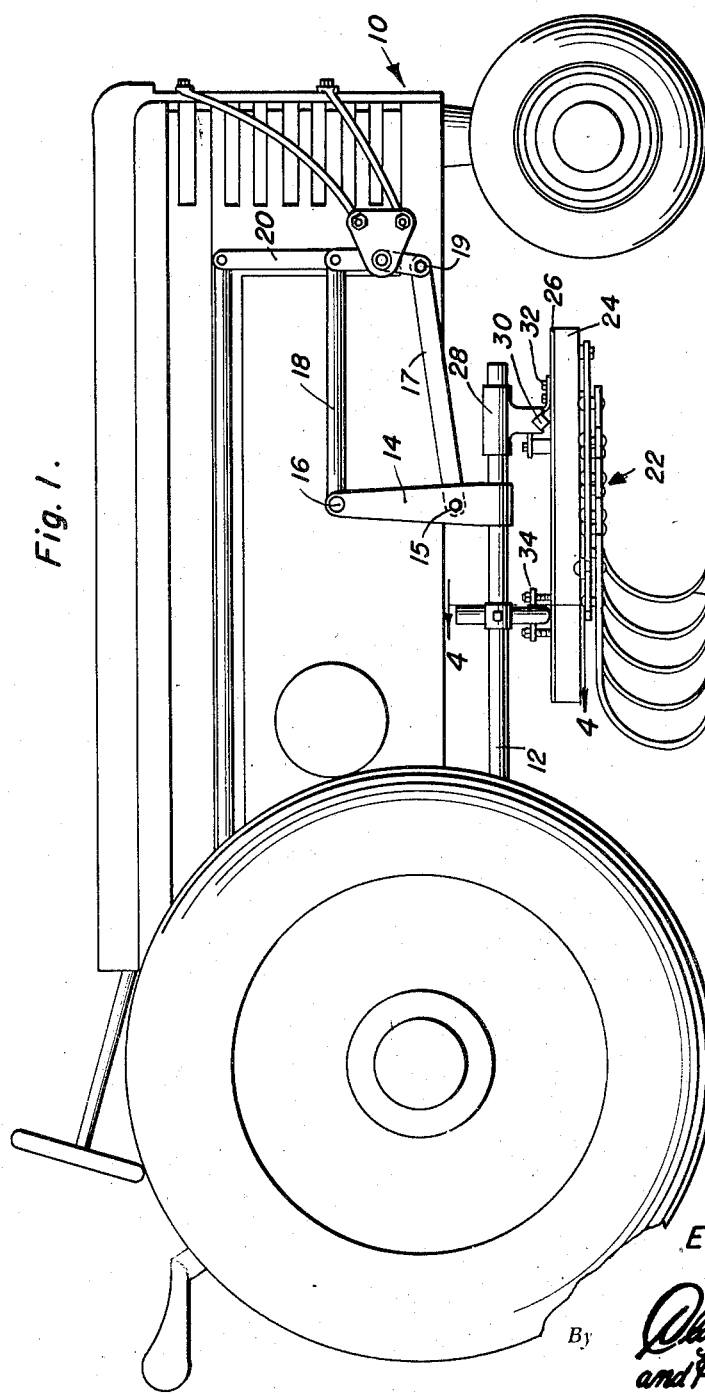
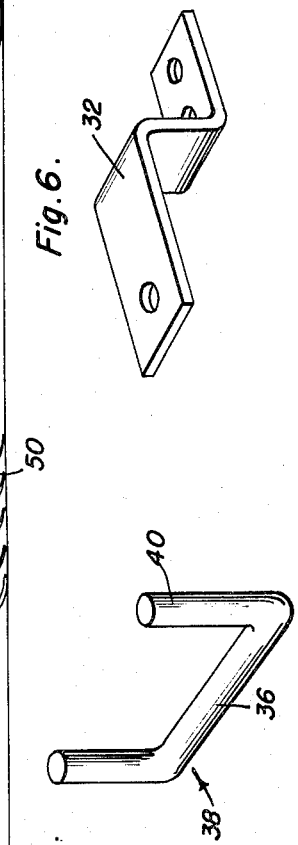
Inventor
Early R. Burgess
By *Clarence A. O'Brien and Harvey B. Jacobson*
Attorneys

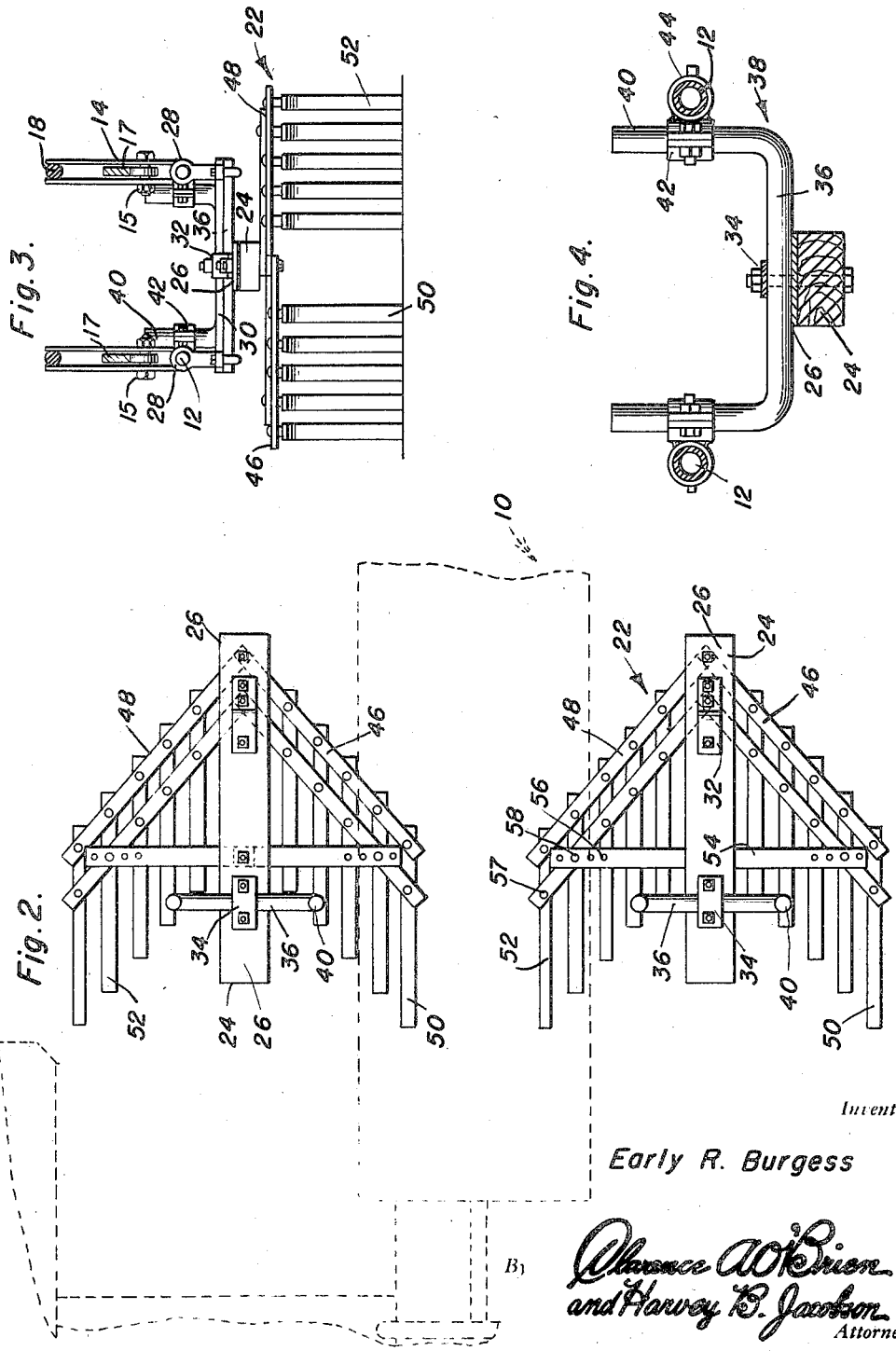

Patented July 17, 1951

2,560,631

UNITED STATES PATENT OFFICE 2,560,631

AGRICULTURAL ATTACHMENT FOR TRACTORS

Early R. Burgess, Good Hope, Ga.

Application June 9, 1947, Serial No. 753,564

3 Claims. (Cl. 97—47)

This invention relates to new and useful improvements in agricultural attachments and the primary object of the present invention is to provide a device of the character referred to including a plurality of spring harrow teeth which are horizontally adjustable for varying the spaces between the furrow lines made by the teeth.

Another important object of the present invention is to provide a novel and improved means for mounting the attachment on a conventional tractor.

A further aim of the present invention is to provide a farm implement of the class described that is quickly and readily disassembled for transporting or repairing of the device.

A still further aim of the present invention is to provide a farm implement that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the device attached to a conventional tractor;

Figure 2 is a top plan view of a pair of the agricultural attachments, with dotted lines showing the body of the tractor;

Figure 3 is a front elevational view of one of the attachments, with the support mechanism carried by the tractor shown in part;

Figure 4 is an enlarged vertical transverse sectional view of one of the attachments, taken on line 4—4 of Figure 1;

Figure 5 is a perspective view of the yoke; and,

Figure 6 is a perspective view of the bracket carried by one end of the beam.

Referring now to the drawings in detail, wherein for the purpose of illustration, there is disclosed a preferred embodiment of the present invention, the numeral 10 represents a conventional tractor of any suitable type equipped with a pair of longitudinally extending supporting members 12. These members 12, are supported by hangers 14 that are pivoted as at 16 to arms 18, which are actuated by levers 20 for vertical adjustment of members 12. The hangers 14 are pivotally attached at 15 to links 17 which are engaged at 19 with a supporting structure on the tractor.

The present invention does not in any way attempt to change the conventional structure already set forth, but merely is an agricultural attachment used in conjunction with this structure.

The agricultural attachment designated generally by the numeral 22, comprises a longitudinal beam 24 to which is secured a wearing plate 26. Mounted on members 12 are sleeves 28 to which is suitably secured a cross bar 30.

An angular bracket 32 is removably carried by plate 26 for clamping engagement with bar 30, to provide means for transversely adjusting the beam relative to bar 30.

A fastening member 34 carried by the beam at one end engages the web portion 36 of a substantially U-shaped yoke designated generally by the numeral 38.

The legs 40 of this yoke are adjustably received by perpendicular split clamp portions 42 of sleeve assemblies 44 which are adjustably and removably carried by members 12.

At one end of beam 24 are pairs of parallel tool holding arms 46 and 48, that incline rearwardly and outwardly from the beam.

A series of echeloned spring harrow teeth 50 are carried by arms 46, and a second series of echeloned spring harrow teeth 52 are carried by arms 48. A cross member 54 removably carried by the beam has its terminal portions provided with a plurality of apertures 56 for selectively aligning apertures 57 in the pairs of arms 46 and 48. Bolts or the like 58 connecting these aligned apertures permit adjustment of the series of arms relative to the beam.

In practical use of this device, preferably two of the previously described attachments are mounted on opposite sides of the tractor, so that beams 24 move in the line with the movement of the tractor, as shown in Figure 2 of the drawings. By actuating lever 20 the members 12 may be raised or lowered to position teeth 50 and 52 relative to the ground surface over which the tractor is driven.

By adjusting bar 54 to the pair of arms 46 and 48 the space between adjacent parallel furrows formed by the teeth 50 and 52 may be variable.

Although shown in the drawings a pair of such agricultural attachments are preferably applied to the tractor, one or even a plurality of such attachments may be used without changing the function of the present invention. It is also obvious from the foregoing description that one end of the beam 24 may be raised or lowered by adjustment of the yoke 38 in the clamp portions 42 of the sleeve assemblies for angular adjustment of the series of harrow teeth.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What is claimed as new is as follows:

1. A cultivating attachment for tractors having a pair of parallel vertically movable, longitudinally extending supporting members comprising a sleeve on each of said supporting members, a cross bar fixed to said sleeves and extending between said supporting members, a longitudinally extending beam pivoted on said cross bar and slidable along the length thereof, a U-shaped yoke between said supporting members, second sleeves on said supporting members rearwardly of said first sleeves, a clamp on each of said latter sleeves engaging the side legs of said yoke for vertical and longitudinal adjustment of said yoke, a fastening member fixed on the rear end of said beam and engaging the transverse web portion of said yoke for sliding adjustment along the length thereof, and harrow teeth depending from said beam.

2. A cultivator attachment for a tractor having a pair of parallel longitudinally extending spaced apart supporting members comprising a cross bar extending transversely of and intermediate the ends of said supporting members and mounted on said members for sliding movement therealong, a beam extending longitudinally beneath said supporting members and having one end slidably and pivotally mounted on said cross bar for sliding movement therealong and for rocking movement about said cross bar as a pivotal axis, means carried by said supporting members and operatively connected to the other end of said beam for fixedly positioning the latter in a select position of said sliding and rocking movement, and harrow teeth on opposite sides of and dependingly carried by said beam.

3. A cultivator attachment for a tractor having a pair of parallel longitudinally extending spaced apart supporting members comprising a cross bar extending transversely of and intermediate the ends of said supporting members and mounted on said members for sliding movement therealong, a beam extending longitudinally beneath said supporting members and having one end slidably and pivotally mounted on said cross bar for sliding movement therealong and for rocking movement about said cross bar as a pivotal axis, means carried by said supporting members and operatively connected to the other end of said beam for fixedly positioning the latter in a select position of said sliding and rocking movement, said means comprising a U-shaped yoke having its bight overlying said beam and having its legs extending transversely of said supporting members, means carried by said supporting members and engageable with the legs of said yoke for selectively securing the latter to said supporting members, and means carried by said beam and engageable with the bight of said yoke for detachably securing said beam to said yoke, and harrow teeth on opposite sides of and dependingly carried by said beam.

EARLY R. BURGESS.

REFERENCES CITED

The following references are of record in the file of this patent:

UNITED STATES PATENTS

| Number | Name | Date |
| --- | --- | --- |
| 692,127 | Ezell | Jan. 28, 1902 |
| 841,461 | Shuart | Jan. 15, 1907 |
| 902,367 | Benton et al. | Oct. 27, 1908 |
| 983,450 | Kelly | Feb. 7, 1911 |
| 1,061,354 | Brigden | May 13, 1913 |
| 2,269,344 | Nelson | Jan. 6, 1942 |
| 2,416,006 | Howard et al. | Feb. 18, 1947 |